(12) United States Patent (10) Patent No.: US 8,913,963 B2
Lundström et al. (45) Date of Patent: Dec. 16, 2014

(54) METHOD AND DEVICE IN OVER-THE-AIR TEST ENVIRONMENT

(75) Inventors: Anders Lundström, Karlstad (SE); Henrik Asplund, Stockholm (SE); Mikael Kvist, Solna (SE); Emil Mellfeldt, Järlfälla (SE)

(73) Assignee: Unwired Planet, LLC, Reno, NV (US)

( * ) Notice: Subject to any disclaimer, the term of this patent is extended or adjusted under 35 U.S.C. 154(b) by 693 days.

(21) Appl. No.: 13/130,617

(22) PCT Filed: Nov. 5, 2009

(86) PCT No.: PCT/SE2009/051252
§ 371 (c)(1),
(2), (4) Date: May 23, 2011

(87) PCT Pub. No.: WO2010/059103
PCT Pub. Date: May 27, 2010

(65) Prior Publication Data
US 2011/0263215 A1 Oct. 27, 2011

Related U.S. Application Data

(60) Provisional application No. 61/117,395, filed on Nov. 24, 2008, provisional application No. 61/117,379, filed on Nov. 24, 2008.

(51) Int. Cl.
*H04B 17/00* (2006.01)
*H04W 24/06* (2009.01)

(52) U.S. Cl.
CPC ........... *H04W 24/06* (2013.01); *H04B 17/0095* (2013.01)
USPC ..................... 455/67.11; 455/67.12

(58) Field of Classification Search
CPC .......................... H04B 17/0092; H04B 17/095
USPC ........................................ 455/67.11, 67.12
See application file for complete search history.

(56) References Cited

U.S. PATENT DOCUMENTS 4,679,248 A * 7/1987 McKeown ................. 455/226.1
5,355,519 A 10/1994 Hasegawa
(Continued)

FOREIGN PATENT DOCUMENTS

DE 10 2007 014692 2/2008
EP 1379019 A1 1/2004

OTHER PUBLICATIONS

U.S. Appl. No. 13/130,636, filed May 23, 2011; Inventor: Lundstrom et al.
(Continued)

*Primary Examiner* — Wen Huang
(74) *Attorney, Agent, or Firm* — Nixon & Vanderhye P.C.

(57) ABSTRACT

The present invention relates to a device and method for simulating a radio channel with a defined characteristic between at least one antenna port (102a, 102b) of a first device (101), and a second device (103) in a test environment. The device comprises a first antenna (104a) adapted to transmit signals, and arranged to provide a first radio channel (105a) between the first antenna (104a) and the second device (103) and, a second antenna (104b) adapted to transmit signals, and arranged to provide a second radio channel (105b) between the second antenna (104b) and the second device (103). A characteristic of the second radio channel (105b) is dissimilar to a characteristic of the first radio channel (105a). The device further comprises a multiport circuit (106) arranged to connect the at least one antenna port (102a, 102b) of the first device (101) with the first and second antennas (104a, 104b), and adapted to split a signal received from the at least one antenna port (102a, 102b) into at least two split signals, and to forward the at least two split signals to the first and second antenna 104a, 104b respectively. The device also comprises a modifying circuit (107a) adapted to modify an amplitude relation between the at least two split signals, thereby simulating a radio channel between the at least one antenna port (102a, 102b) and the second device (103) with a characteristic which is a combination of the characteristic of the second radio channel (105b) and the characteristic of the first radio channel (105a) in a relation corresponding to the modified amplitude relation.

27 Claims, 11 Drawing Sheets

(56) References Cited

U.S. PATENT DOCUMENTS

| | | | |
|---|---|---|---|
| 6,915,113 B1* | 7/2005 | Cardiff | 455/67.14 |
| 2003/0003883 A1* | 1/2003 | Wallace et al. | 455/115 |
| 2003/0073463 A1* | 4/2003 | Shapira | 455/562 |
| 2005/0267715 A1 | 12/2005 | Kolu et al. | |
| 2007/0136046 A1 | 6/2007 | Liu | |
| 2007/0243826 A1 | 10/2007 | Liu | |
| 2008/0056340 A1 | 3/2008 | Foegelle | |
| 2008/0114580 A1 | 5/2008 | Chin et al. | |
| 2008/0305754 A1* | 12/2008 | Foegelle | 455/115.1 |

OTHER PUBLICATIONS

European Communication dated Oct. 8, 2013 with Supplementary European Search Report in European Application No. EP 09 82 7817.9.

European Communication dated Oct. 9, 2013 with Supplementary European Search Report in European Application No. EP 09 82 7816.1.

Kildal, P. et al.; "Correlation and Capacity of MIMO Systems and Mutual Coupling, Radiation Efficiency, and Diversity Gain of Their Antennas: Simulations and Measurements in a Reverberation Chamber", IEEE Communications Magazine, vol. 42, No. 12, Dec. 1, 2004, pp. 104-112, XP0111123382.

European Communication dated Oct. 8, 2013 with Supplementary European Search Report in European Application No. EP 09 82 7817.

Author Unknown. "LitePointe One-Box MIMO Manufacturing Test Software." 2006, available online at www.litepoint.com.

Office Action mailed Feb. 12, 2014 in U.S. Appl. No. 13/130,636.

ETSI TR 125 943 v7.0.0 (Jun. 2007); Universal Mobile Telecommunications System (UMTS); Deployment Aspects (3GPP TR 25.943 version 7.0.0 Release 7); 15 pages.

Rec. ITU-R M.1225; Recommendation ITU-R M.1225; Guidelines for Evaluation of Radio Transmission Technologies for IMT-1000 (Question ITU-R 39/8) (1997); 60 pages.

\* cited by examiner

METHOD AND DEVICE IN OVER-THE-AIR TEST ENVIRONMENT

This application is the U.S. national phase of International Application No. PCT/SE2009/051252, filed Nov. 5, 2009, which designated the U.S. and claims priority to U.S. Provisional Application No. 61/117,395, filed Nov. 24, 2008, and U.S. Provisional Application No. 61/117,379 filed Nov. 24, 2008.

TECHNICAL FIELD

The present invention relates to over-the-air testing of wireless communication devices in a test environment and in particular to a device and a method for simulating a radio channel with a defined characteristic between two wireless communication devices.

BACKGROUND

Wireless equipment usually undergoes many kinds of tests in order to ensure sufficient performance. Some tests are mandated by standards, while others are performed as part of product development and verification. A particular class of tests is that where the over-the-air performance of the communication between one or several wireless transmitter and receivers is tested. The purpose of such a test could be to ensure that handsets are adequately designed and work well in the presence of a human being, which is important for operators when determining whether to subsidize mobile handsets from different vendors, or it could be to evaluate performance under realistic load and channel conditions which would be difficult to achieve at reasonable cost using cabled equipment.

Several different types of over-the-air testing exist. Some examples of the most common ones are described in the following paragraphs.

Reverberation Chamber Testing

Here the transmitting and receiving antennas are placed in a reverberation (or scattered field) chamber, which in its simplest form is a metallic box that gives rise to numerous reflections causing an ideally isotropic multipath distribution. The purpose of reverberation chamber testing is to test radiated performance of mobile stations. Specially designed reverberation chambers, so called Fading Boxes (FBoxes), are used to generate a fading radio environment suitable for system testing of a Radio Access Network. A reverberation chamber is schematically illustrated in FIG. 1.

The mobile station 120 under test, commonly referred to as the device under test (DUT), is either placed physically inside the reverberation chamber 110 or connected via cables to test antennas placed inside the chamber 110. In FIG. 1, the transmitting and receiving antennas 130 of the radio base station (RBS) are placed inside the chamber 110 and are connected to the RBS antenna ports on the outside of the chamber. A rotating stirrer 140 is introduced in the chamber 110 in order to achieve different boundary conditions to obtain fading conditions that vary in time, and thereby simulate that the mobile stations are moving around. A line of sight shield 150, may also be introduced in the chamber to affect e.g. fading or delay conditions.

The reverberation chamber 110 generates a radio environment where the received signals are faded according to a Rayleigh distribution and with a delay spread that is proportional to the size of the reverberation chamber. The radio signals from the mobile stations 120 in such a reverberation chamber are received by the RBS antennas 130 with a rather small delay spread due to the short propagation paths in the reverberation chamber. FIG. 2 shows an example of a channel model, characterized by a distribution of the signal power on a number of taps spread in time, so called delay taps. Each tap is faded and has a specified time distance to other taps as well as a specified power relative to other taps. The reverberation chamber 110 illustrated in FIG. 1 will by design generate a channel having a certain channel impulse response that may be similar to some particular channel model. For instance, the ITU (International Telecommunication Union) have described a set of channel models ranging from low to high time dispersion conditions, to be used for evaluating performance under the expected channel conditions in wireless cellular systems. A particular fading box could be designed to give channel conditions resembling one such model, but not the full range of models.

Anechoic Chamber Testing

In contrast to the reverberation chamber, the inside walls of the anechoic chamber are covered with absorbing material in order to reduce reflections to a minimum. This allows for an ideally deterministic radio environment to be set up, either with a single transmitter and/or receiver forming a line-of-sight link, or using multiple transmitters and/or receivers to create a deterministic multipath distribution.

Field Measurements

This is perhaps the most straight-forward method for testing. In field measurements, also referred to as drive tests, the products are tested in the real environment where they are to be used, or in a semi-controlled environment having characteristics similar to the real environment.

The large potential gains promised by the use of multiple transmit and/or receive antennas, also referred to as Multiple Input Multiple Output (MIMO) techniques, has resulted in such technology becoming an integral part of many wireless standards, such as LTE, WCDMA, WIMAX, etc. It is therefore expected that a multitude of equipment with multiple antennas will enter the market. One challenge is that the performance of MIMO products in particular depends both on the ability of the wireless channel to support multiple orthogonal communication channels, i.e. the channels "richness", and on how well the antenna configurations at both ends of the link allow utilizing the "richness" of the wireless medium to support diversity or multi-stream transmission.

The over-the-air performance of a certain MIMO-capable mobile station can therefore be expected to depend not only on the design of the mobile station itself, but also on both the wireless channel conditions and the antenna configuration at the other end of the wireless link. The performance will thus for example depend on whether spatial diversity or polarization diversity is used, or it may depend on the spatial separation of antennas in a space diversity setup.

As the performance of especially MIMO equipment is expected to depend both on the wireless channel as well as the antenna configurations at both ends of the link, the number of test cases may become large. The need for testing against different antenna configurations at the other end of the link may require physically shifting antennas or switching between multiple pre-installed antennas, which can become very complex and time-consuming.

Furthermore, in the case of reverberation chamber testing, it would be necessary to have reverberation chambers of different sizes in order to create reverberation chamber test environments with different delay spreads, since the delay spread of a reverberation chamber is proportional to the size of the reverberation chamber. A change of delay spread during testing would thus also require complex and time consuming reconfigurations of the test environment. Besides, the size of a reverberation chamber intended to simulate a delay spread that corresponds to a channel model representing for example a rural area environment would have a too large foot print to be placed in a test lab.

SUMMARY

An object of the present invention is to achieve a device and a method that obviate one or more of the above disadvantages, singly or in combination. It would be desirable that the device and method enable the configuration of many different test cases for over-the-air testing of single- and multi-antenna wireless communication devices in a test environment, without having to do complex and time consuming reconfigurations of the test environment setup. It would also be advantageous to allow simulation of a certain radio channel characteristic in a simple way.

One or more of these objects and others are addressed by the device and the method according to the independent claims. Advantageous embodiments of the invention are defined in the dependent claims.

In accordance with a first aspect of the present invention, a device for simulating a radio channel with a defined characteristic between at least one antenna port of a first device and a second device in a test environment is provided. The device comprises a first antenna adapted to transmit signals, and arranged to provide a first radio channel between the first antenna and the second device, and a second antenna adapted to transmit signals, and arranged to provide a second radio channel between the second antenna and the second device. A characteristic of the second radio channel is dissimilar to a characteristic of the first radio channel. The device also comprises a multiport circuit arranged to connect the at least one antenna port of the first device with the first and second antennas. The multiport circuit is adapted to split a signal received from the at least one antenna port into at least two split signals, and to forward the at least two split signals to the first and second antenna, respectively. The device further comprises a modifying circuit adapted to modify an amplitude relation between the forwarded at least two split signals. Thereby, a radio channel between the at least one antenna port and the second device can be simulated, having a characteristic which is a combination of the characteristic of the second radio channel and the characteristic of the first radio channel in a relation corresponding to the modified amplitude relation.

In accordance with a second aspect of the present invention, a method of simulating a radio channel with a defined characteristic between at least one antenna port of a first device, and a second device in a test environment is provided. The method comprises splitting a signal received from the at least one antenna port of the first device into at least two split signals, and forwarding the at least two split signals to the first and second antenna respectively. The method further comprises modifying an amplitude relation between the forwarded at least two split signals, and transmitting the modified forwarded at least two split signals on a first and second antenna respectively. The first antenna is providing a first radio channel between the first antenna and the second device, and the second antenna is providing a second radio channel between the second antenna and the second device. A characteristic of the second radio channel is dissimilar to a characteristic of the first radio channel. Thereby, a radio channel between the at least one antenna port and the second device can be simulated, having a characteristic which is a combination of the characteristic of the second radio channel and the characteristic of the first radio channel in a relation corresponding to the modified amplitude relation.

An advantage of some embodiments of the present invention is that they facilitate rapid, controllable, and reproducible over-the-air testing of single- and multi-antenna wireless communication devices.

Another advantage of some embodiments of the present invention is that they make it possible to simulate radio channels specified by various standards, but also own defined radio channels.

A further advantage of some embodiments of the present invention is that they make the reverberation chamber even more suitable for system testing of radio access networks where large volumes of communication devices are used and where each communication device has an independent radio channel.

DETAILED DESCRIPTION

Figure 1:
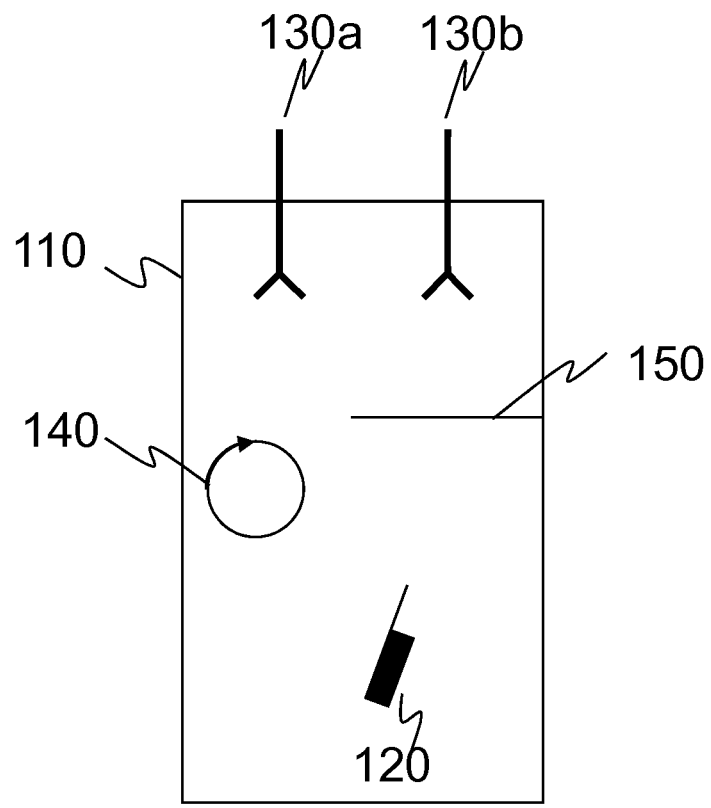
FIG. 1 illustrates schematically a reverberation chamber.
Figure 2:
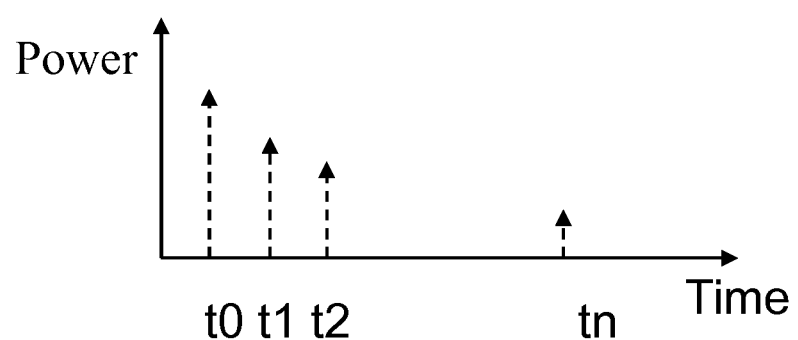
FIG. 2 illustrates an example of a channel model.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to radiation testing of wireless equipment in a reverberation chamber. It should though be noted that the invention and its exemplary embodiments may also be applied to other test environments and test chambers, such as anechoic chambers or field test environments.

In the present invention, the drawbacks that comes with the need for testing against different antenna configurations and with different channel characteristics, which traditionally requires a physical shift of antennas or a switch between multiple pre-installed antennas or reverberation chambers, are addressed by a device connectable to the antenna port or ports of a wireless communication device such as an RBS or a mobile station in a test environment. In the following, the present invention will be described with the device connected to an RBS transmitting signals to a mobile station placed in a reverberation chamber. It should though be noted that the device may alternatively be connected to the mobile station transmitting signals to the RBS. Still another possibility is to use the device also when receiving signals from the mobile station (or from the RBS when connected to the mobile station). If the circuitry of the device is made reciprocal, the same simulated channel characteristics will be achieved both in the receiving mode and in the transmitting mode.

The device, connected to one or more antenna ports of an RBS, allows to simulate a wide range of radio channel characteristics between the RBS and the mobile station, in a time efficient and simple way. Instead of actually changing the test environment to produce radio channels of a certain characteristic between the antenna of the RBS and the mobile station, the device is connected to the RBS antenna ports and makes it possible to simulate such a change by manipulating the signals transmitted to the mobile station and thereby imitating a certain radio channel characteristic. Different polarization, fading correlation, fading statistics, delay spread and delay characteristics are some examples of radio channel characteristics that are possible to simulate.

Figure 3:
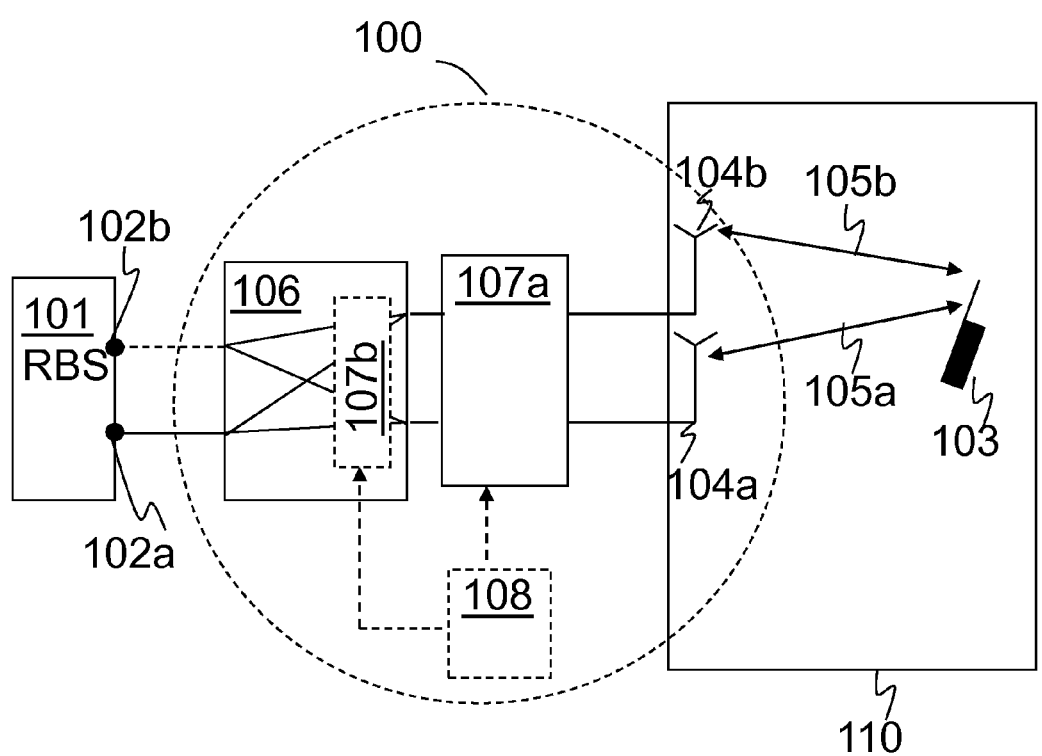
FIG. 3 illustrates schematically the device in a test environment comprising a test chamber according to some embodiments of the present invention.

Schematically illustrated in FIG. 3, and according to some embodiments of the present invention, is the device 100. The device 100 makes it possible to simulate a radio channel in a reverberation chamber 110 with a defined characteristic between one or more antenna ports 102a, 102b of a first device 101 which in this embodiment is an RBS, and a second device 103 which in this embodiment is a mobile station. This device 100 will thus replace the ordinary antenna configuration that is normally connected to the antenna port(s) 102a, 102b of the RBS 101. As mentioned above, the device may also be used to simulate a radio channel in any other test chamber or environment, such as in an anechoic chamber or in a field test environment.

The device comprises two antennas 104a, 104b, adapted to transmit signals within the reverberation chamber 110. These transmitted signals are then received by the mobile station 103 placed in the reverberation chamber 110. The first antenna 104a is arranged to provide a first radio channel 105a between this first antenna 104a and the mobile station 103, and the second antenna 104b is arranged to provide a second radio channel 105b between the second antenna 104b and the mobile station 103. The two antennas 104a, 104b may for example have different antenna characteristics, such as different antenna polarizations, which will in turn provide radio channels 105a, 105b with dissimilar polarization characteristics. In another example, the antennas 104a, 104b are placed within the reverberation chamber in a way that provides different propagation paths from the antennas to the mobile station, and thus also dissimilar radio channel characteristics, such as delay and fading characteristics.

The device 100 further comprises a multiport circuit 106, which connects the two antennas 104a, 104b with the antenna port(s) 102a, 102b of the RBS. The multiport circuit 106 is adapted to split signals received from the antenna port(s) 102a, 102b of the RBS, and to forward the split signals to the two antennas 104a, 104b. In the case of a single antenna RBS 101, an example of a multiport circuit 106 is a three-port circuit coupling signals received on one port into two ports. The three-port circuit will have the two antennas 104a, 104b connected to its outgoing ports, and the one incoming port connected to the single antenna port 102a of the RBS 101.

The device 100 also comprises a modifying circuit 107a, 107b which is adapted to modify the amplitude relation between the split signals forwarded by the multiport circuit 106, before they are transmitted on the two antennas 104a, 104b. The modifying circuit 107a may for example be implemented as attenuators and/or amplifiers which attenuates and/or amplifies the power of the split signals from the multiport circuit 106, thereby modifying the amplitude relation between the split signals before transmitting them on the two antennas. In another exemplary embodiment, the modifying circuit 107a may simply correspond to the inbuilt attenuation of the feeders between the multiport circuit 106 and the antennas 104a, 104b, and will thus not correspond to an explicitly added component such as an attenuator. In still another exemplary embodiment, the modifying circuit 107b and the multiport circuit 106 are integrated. One such example is a three-port circuit that modifies amplitude relations of the signals split on the two outgoing ports.

As indicated above, the modifying circuit(s) 107a and/or 107b and the multiport circuit 106 may be integrated into one single circuit or unit. For example, a single multiport circuit (not shown in the figures) may be configured to perform the functions/functionality of the modifying circuit(s) 107a and/or 107b and the multiport circuit 106. In other words, the modifying circuit(s) 107a and/or 107b and the multiport circuit 106 need not be separate circuits or units, as is schematically illustrated in FIG. 3.

The device 100 is, in the embodiment illustrated in FIG. 3, arranged to simulate a radio channel between the antenna port(s) 102a, 102b of the RBS 101 and the mobile station 103 with a characteristic which is a combination or blending of the dissimilar characteristics of the two radio channels 105a, 105b between the two antennas 104a, 104b respectively and the mobile station 103. The modifying circuit 107a will affect how much power of each of the split signals coming from the multiport circuit 106 that will be transmitted on the two antennas 104a, 104b. With e.g. an attenuator connected to each of the two antennas 104a, 104b, modifying the amplitude of each of the split signals before transmitting them, it is possible to simulate a range of characteristics between the two extremes of, on one hand, a characteristic completely corresponding to the first radio channel 105a characteristic, and, on the other hand, a characteristic completely corresponding to the second radio channel 105b characteristic. These extremes are obtained by completely attenuating the power of a split signal transmitted on one of the antennas 104a, 104b. A characteristic in between these two extremes is obtained by modifying the amplitude relation between the split signals before transmitting them in a way that gives a desired combination of characteristics.

In one embodiment of the present invention, the modifying circuit 107a, 107b is adapted to modify also a delay and/or a phase relation between the split signals forwarded to the two antennas 104a, 104b. This will allow more complex combinations of the split signals transmitted on the two antennas 104a, 104b. The advantage of an implementation with more complex combinations of signals, is that it allows for a simulation of additional radio channel characteristics, such as delay characteristics, delay spread characteristics, polarization characteristics and fading characteristics, and any combination of these radio channel characteristics in one and same test setup. A modifying circuit 107a adapted to modify a delay relation between signals, could be implemented as one or more RF/Opto-circuits where the delay is proportional to the length of the optical fiber. It could also be implemented with a low loss RF-cable, where the delay is proportional to the length of the cable. A modifying circuit 107a, 107b adapted to modify a phase relation could be implemented as a phase shifter. Another alternative is to use a delay circuit according to the above examples, with a very short delay which would thereby be perceived as a phase shift rather than a delay. Still another alternative is to use a 180° or 90° hybrid coupler, which provides two outputs of equal amplitude but with a phase difference (180° or 90°) between them.

Figure 4A:
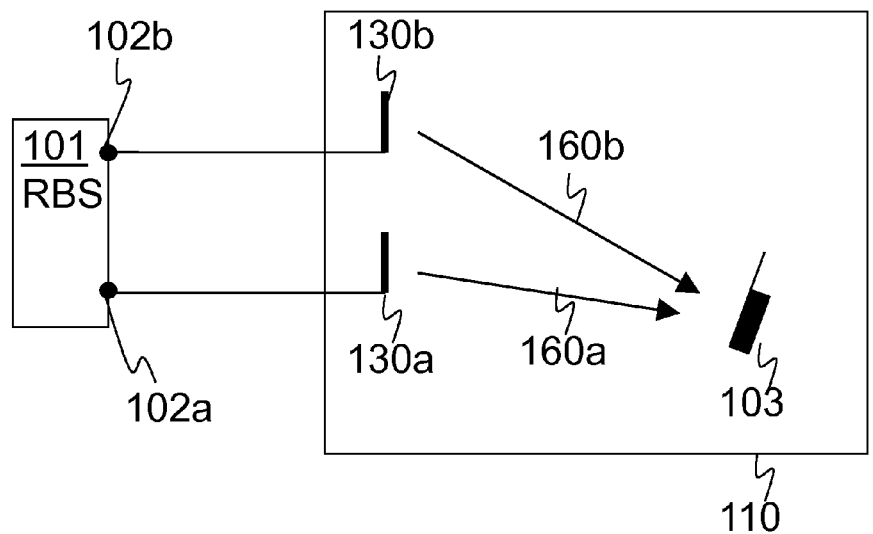
FIG. 4a illustrates schematically a test setup.

FIG. 4a illustrates schematically a typical conventional MIMO test case example of a mobile station 103, also referred to as a device under test (DUT), in a reverberation chamber 110. The two RBS antennas 130a, 130b are each one arranged to provide a radio channel 160a, 160b to the DUT 103. In the following description the first channel 160a is represented by H1(t,f) and the second 160b by H2(t,f). A certain test case could prescribe channel conditions where the two channels are uncorrelated, e.g.

$$E\{H_1(t,f)H_2^*(t,f)\}=0$$

The expectation could be taken over time and/or frequency. Such a channel condition can be readily achieved in a reverberation chamber by separating the two antennas by a certain distance, typically a few wavelengths. However, a second test case might prescribe a non-zero correlation between the two antennas 130a, 130b, e.g.

$$E\{H_1(t,f)H_2^*(t,f)\}=\rho$$

Such a non-zero correlation can be achieved by moving the two antennas closer to each other, or by modifying the chamber to produce a smaller angular spread. However, such solutions to achieve correlation can be impractical. Furthermore, the two antennas will experience mutual coupling if placed close together which will result in lower antenna efficiency.

Figure 4B:
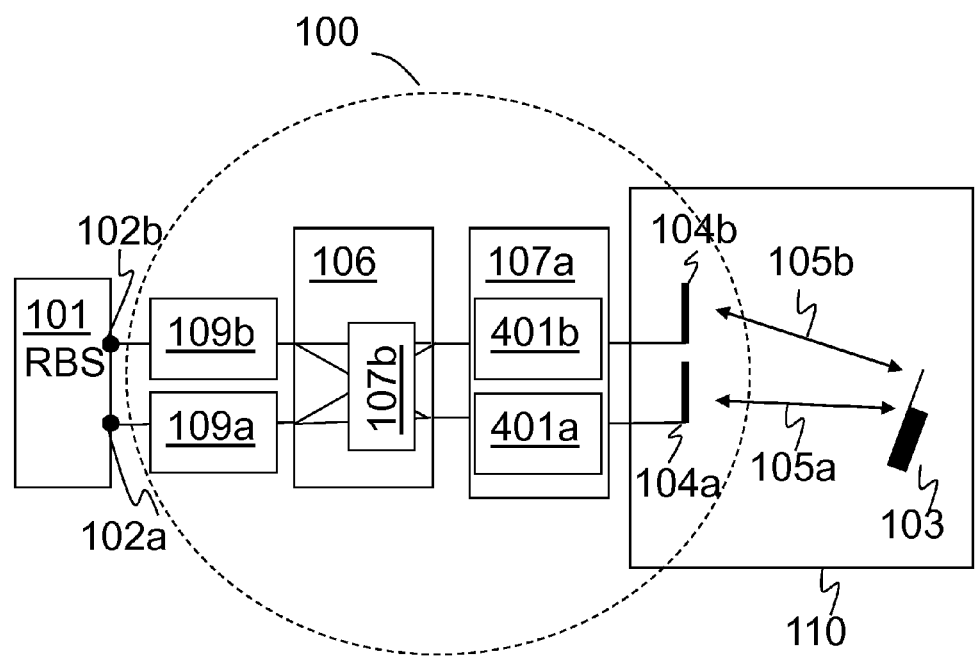
FIG. 4b illustrates schematically the device in a test environment comprising a test chamber according to some embodiments of the present invention.

According to one exemplary embodiment of the present invention schematically illustrated in FIG. 4b, the RBS antennas 130 from the test setup illustrated in FIG. 4a and described above, are replaced by the device 100 also comprising two antennas 104a, 104b. Test signals from two RBS antenna port(s) 102a, 102b, are split into two by the multiport circuit 106 and the split signals are forwarded to the two antennas 104a, 104b, via the modifying circuit 107a, 107b. In this embodiment it is preferable that the two antennas 104a, 104b are substantially uncorrelated, thereby providing radio channels 105a, 105b with uncorrelated fading characteristic. The modifying circuit 107a, 107b is in this embodiment adapted to modify both the amplitude relation between the split signals and the phase relation. A hybrid coupler splits the signals and modifies the phase relation, and an attenuator 401a, 401b at each transmitting antenna 104a, 104b modifies the amplitude relation of the split signals before they are transmitted. This embodiment of the device 100, makes it possible to simulate two radio channels between the DUT 103 and the two antenna ports 102a, 102b respectively, which are correlated to a degree decided by the modified amplitude relation achieved by the attenuators.

The device may also comprise additional attenuators 109a, 109b, attenuating the signals from the two antenna ports 102a, 102b of the RBS with a factor g1 and g2 respectively, before they are forwarded to the multiport circuit 106. These additional attenuators 109a, 109b, may in this embodiment be used to create a power imbalance between the simulated channels, and also to adjust the total channel gain to some desired working point.

The two simulated channels between the antenna ports 102a, 102b and the DUT 103 may be numerically described as follows:

$$\tilde{H}_1(t,f) = g_1 \frac{1}{\sqrt{2}} \begin{bmatrix} 1 \\ 1 \end{bmatrix}^T \cdot \begin{bmatrix} g_3 H_1(t,f) \\ g_4 H_2(t,f) \end{bmatrix}$$

$$\tilde{H}_2(t,f) = g_2 \frac{1}{\sqrt{2}} \begin{bmatrix} 1 \\ -1 \end{bmatrix}^T \cdot \begin{bmatrix} g_3 H_1(t,f) \\ g_4 H_2(t,f) \end{bmatrix}$$

where g3 and g4 corresponds to the attenuation factor of the attenuators 401a, 401b at each of the receiving antennas 104a, 104b. The correlation between these simulated channels can be calculated to be:

$$E\{\tilde{H}_1(t,f)\tilde{H}_2^*(t,f)\} = \frac{|g_3|^2 - |g_4|^2}{|g_3|^2 + |g_4|^2}$$

The above expression has been derived assuming that $g_1=g_2=1$, and that the radio channels 105a, 105b between the two antennas 104a, 104b and the DUT 103 are uncorrelated and have unit power. This assumption can be expressed as $$E\{H_m(t,f)H_n^*(t,f)\} = \delta_{mn} \text{ where } \begin{cases} \delta_{mn} = 0 & m \neq n \\ \delta_{mn} = 1 & m = n \end{cases}$$

Furthermore, if it is found that there is power imbalance between H1(t,f) and H2(t,f) due to differences in the antennas 104a, 104b, this can be compensated for by the attenuators 401a, 401b at each of the antennas 104a, 104b.

The advantage of this embodiment is that it allows to simulate a correlation within a continuous range of values between −1 and 1, simply by setting g3 and g4 of the attenuators 401a, 401b to the desired values. No complex and time-consuming reconfiguration of the test setup, such as moving of the antennas, is thus needed. The only requirement is that the correlation can be made essentially zero between the two channels 105a, 105b, and that the power imbalance between them can be characterized and thereby taken into account.

The embodiments described above can be generalized to multiple mobile stations in the same test. One example would be a load test in which many two-antenna mobile stations are connected to one two-antenna RBS. It would then be possible to enforce a certain correlation between the RBS antennas and also between each pair of antennas of the mobile stations.

It is also possible to generalize the idea to more than two RBS antennas. However, the multiport circuit may be difficult to realize for some combinations of desired correlations. Cascading multiple two-antenna correlating circuits like the one described above with reference to FIG. 4b, is always one possibility. In this way, numerous different correlation levels can be generated, and the final configuration may involve using only some of the ports. Another possibility is to use a DFT matrix (Butler matrix) with more than 2×2 ports. The 180° hybrid coupler is a special case of the DFT matrix for 2×2 ports.

In still another embodiment of the present invention, the different parts of the modifying circuit, e.g. attenuators, amplifiers, delays, delay loops, phase shifters and any other possible circuitry, are variable and controlled, possibly remotely, from a control circuit 108, e.g. an automated test system. This makes it possible to rapidly switch through test conditions with different simulated radio channel characteristics, to facilitate testing. In such an embodiment, performance data feedback from a mobile station or DUT 103, can be used as an input to the control circuit 108.

One important aspect in order to ensure good test conditions is the ability to characterize the properties of the radio channels in the test setup. The result of such a characterization may for example be a lookup table where the channel properties (correlation, polarization, fading statistics, etc.) for each setting of the modifying circuit, e.g. each setting of attenuation and delay combinations, are listed.

As already mentioned above, the two antennas 104a, 104b transmitting the signals in embodiments of the present invention, may for example have different antenna characteristics, which will in turn provide radio channels 105a, 105b with dissimilar characteristics. The antennas 104a, 104b may also be placed within the Reverberation chamber in a way that provides different propagation paths from the antennas to the mobile station, and thus also dissimilar radio channel characteristics.

Figure 5A:
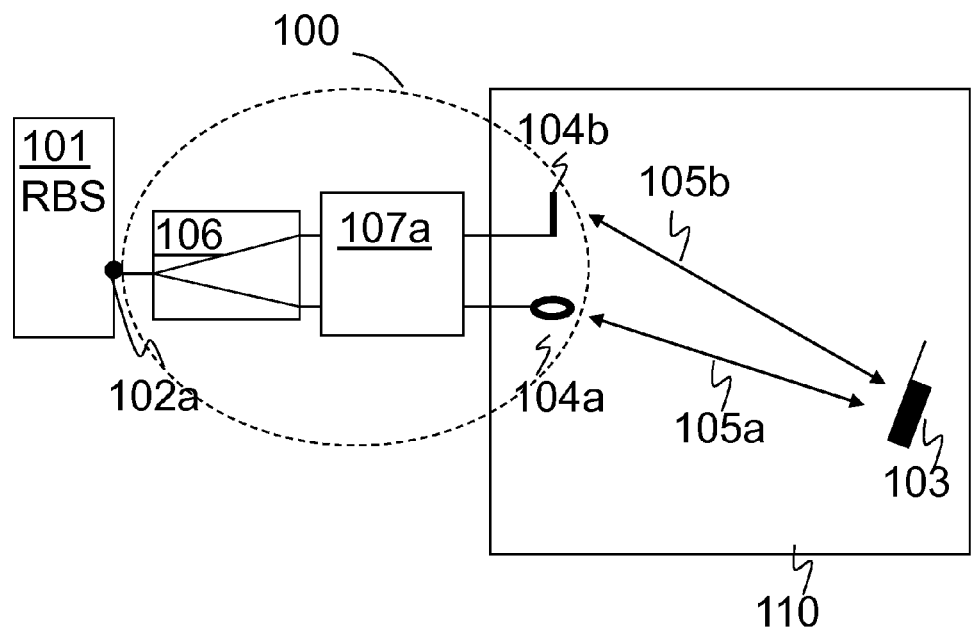
FIG. 5a illustrates schematically the device in a test environment comprising a test chamber according to some embodiments of the present invention.

In one embodiment, the first and second antennas 104a, 104b, are arranged to provide orthogonally polarized radio channels. In an exemplary embodiment, schematically illustrated in FIG. 5a, the first antenna 104a is horizontally polarized, and the second antenna 104b is vertically polarized. The power of the split signals transmitted from these antennas 104a, 104b can thus be modified to create a range of polarization characteristics, ranging from pure horizontal polarization, which is the characteristic of a first of the radio channels 105a, to pure vertical polarization, which is the characteristic of the second radio channel 105b. Another way of seeing it is that the setup makes it possible to simulate a radio channel with a defined cross-polarization scattering characteristic. This embodiment of the invention can also be combined with a modification of delay and/or phase relation between the split signals in order to simulate a defined polarization characteristic together with some other radio channel characteristic such as a delay characteristic.

It is acknowledged that the phase shift between the polarization characteristics of the two radio channels 105a, 105b in this embodiment may not be known, but this is anyway not a problem since the channel conditions in the reverberation chamber can be made such that the vertical and horizontal components fade independently. This means that the phase is anyway randomized.

Figure 5B:
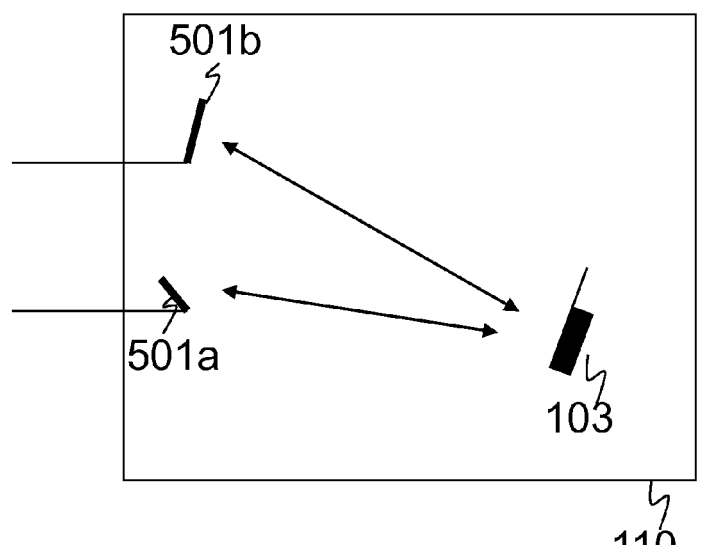
FIG. 5b illustrates schematically a test setup.

The reason for why it is desirable to simulate different cross-polarization scattering characteristics in test environments is explained by the following. When two antennas 501a, 501b are transmitting with polarizations P1 and P2 respectively (see FIG. 5b), the polarizations can be described by vectors in a spherical coordinate system centered on the corresponding antenna.

$$p_1 = p_1{}^\theta \hat{\theta} + p_1{}^\phi \hat{\phi}$$

$$p_2 = p_2{}^\theta \hat{\theta} + p_2{}^\phi \hat{\phi}$$

The radial components are zero for transverse electromagnetic waves. Due to attenuation and scattering in the radio channel, some parts of the energy transmitted with one polarization will be scattered into the orthogonal polarization. This can be described by a polarimetric channel matrix:

$$H = \begin{bmatrix} s_{\theta\theta} & s_{\theta\varphi} \\ s_{\varphi\theta} & s_{\varphi\varphi} \end{bmatrix}$$

This channel matrix has been found to have certain properties in field measurements. For instance, the components of this matrix experience uncorrelated fading, and the off-diagonal (cross-polar) elements have weaker average power than the diagonal (co-polarized). However, changing the polarization of the transmit antennas requires physically modifying or replacing the antennas 501a, 501b, which is a time-consuming and complex task. Using the above described embodiment of the present invention, will thus enable such testing in a simple and time efficient way.

Figure 6:
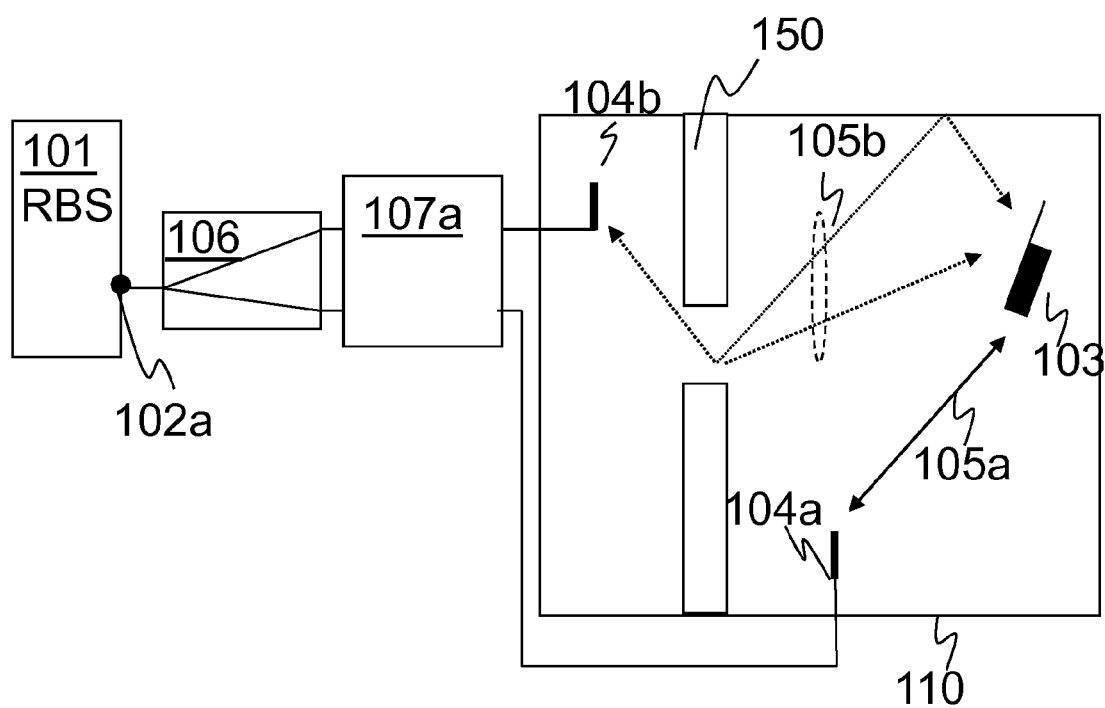
FIGS. 6 and 7a illustrate schematically the device in a test environment comprising a test chamber according to some embodiments of the present invention.

In yet another embodiment of the present invention, the above described device 100, is used to simulate a radio channel with a defined fading statistics characteristic. In this embodiment, schematically illustrated in FIG. 6, the first antenna 104a is arranged to be in line-of-sight with the mobile station, thus providing a "line-of-sight radio channel" 105a, and the second antenna 104b is arranged to not be in line-of-sight with the mobile station, thus providing a "non line-of-sight radio channel" 105b. A line of sight condition between transmitter and receiver, i.e. the ability to visually sight the transmitter from the receiver, tend to change the fading statistics from Rayleigh to Rice. Additionally, the polarization scattering is different (less polarization cross-coupling) in a line-of-sight situation. Rice fading is characterized by the K factor, which captures the power ratio between the direct (constant) path and the diffuse (Rayleigh) part. In the case where one antenna experiences a Rayleigh fading channel and the other a constant channel (non fading) the power ratio between the two is simply the K factor. By modifying the amplitude relation between the split signals transmitted on the two antennas 104a, 104b, different combinations of a Rayleigh and a Rice fading characteristics may be simulated, thereby making it possible to simulate a range of values of the K factor without any time-consuming and complex reconfigurations of the test environment. It is e.g. important to test that MIMO antenna configurations work well in line-of-sight conditions, as the Signal to Interference plus Noise Relation (SINR) is usually high in such conditions leading to good potential for multi-stream transmission. Fading characteristics such as fading correlation may also be simulated by arranging the two antennas 104a, 104b to provide different fading correlation characteristics.

In an alternative embodiment, similar to the previous one, the antennas 104a, 104b are arranged to provide different delay spread characteristics. A first antenna may for example provide a low delay spread channel, and the second one a higher delay spread, and a modifying circuit such as a network of attenuators may modify the amplitude relation between the split signals transmitted on the two antennas, in order to simulate a desired channel delay spread as a combination of the dissimilar delay spread characteristics.

Other delay characteristics may also be simulated by delaying the split signals in different ways before transmitting them. In such an embodiment, the modifying circuit 107a, 107b is adapted to modify the delay relation between the split signals. This is an alternative to the previously described embodiment, where the delay is a characteristic of the first and second radio channels 105a, 105b provided by the two antennas 104a, 104b.

Figure 7A:
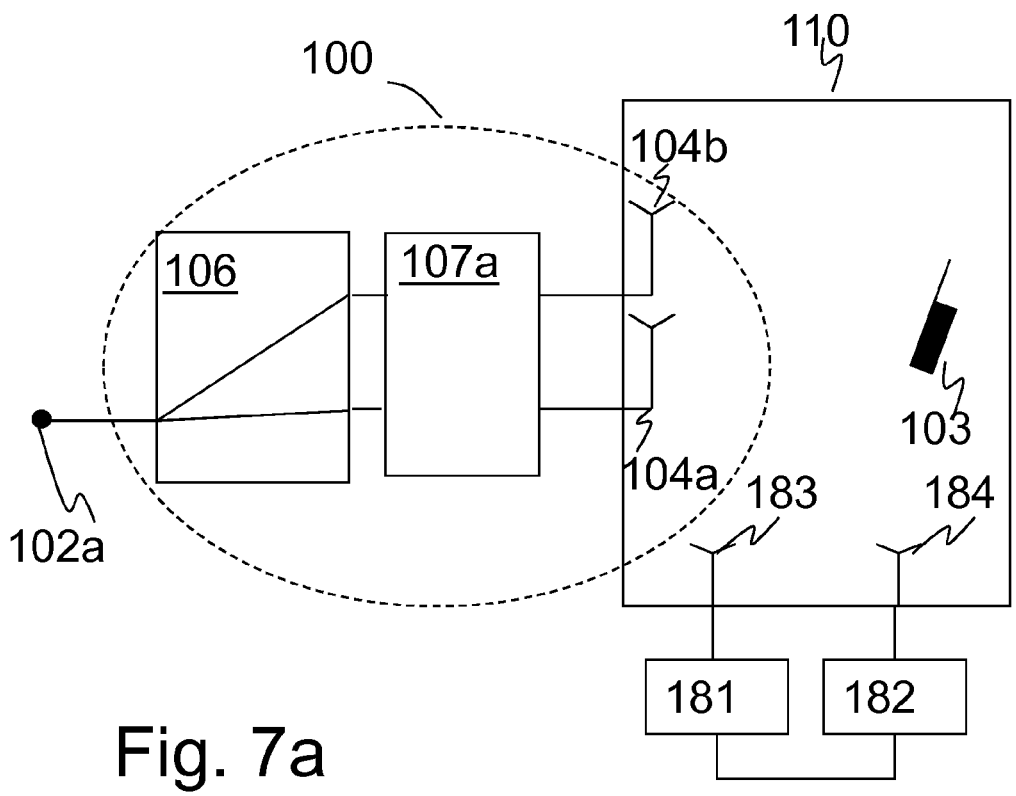

It should be noted that according to embodiments of the present invention, the device 100 may be an integrated part of a reverberation chamber 110, with the antennas 104a, 104b of the device 100 arranged within the reverberation chamber, as illustrated in FIG. 7a. Furthermore, by adding an external delay circuit to the reverberation chamber 110, where part of the signals in the reverberation chamber is linked through a delay line 181 and an attenuator or amplifier 182 and then linked back to the reverberation chamber, the signal transmitted by the antennas 104a, 104b of the device 100, will already be distributed in time and power when received by the mobile station.

Figure 7B:
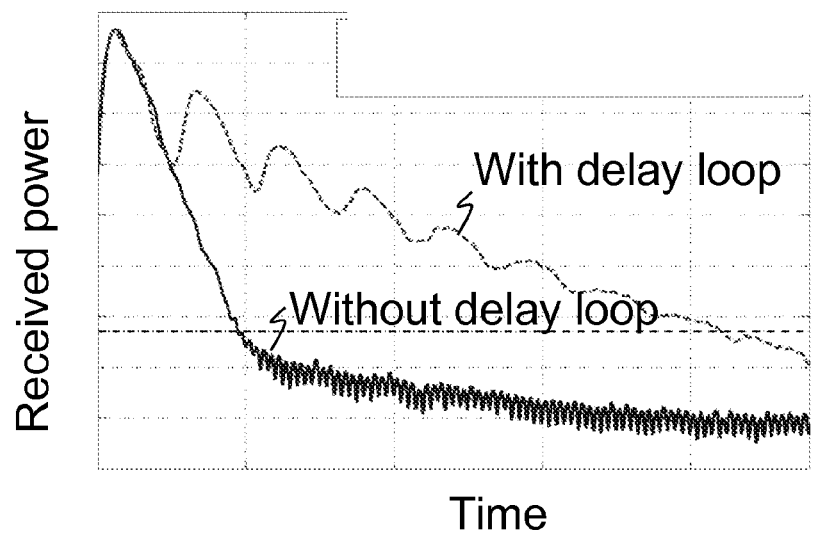
FIG. 7b illustrates the delay profile for a reverberation chamber with and without delay loop.

Part of a faded radio signal in the reverberation chamber will be received by the Rx antenna 183 of the delay circuit and fed into the delay line 181 and attenuator/amplifier 182, where it will be delayed and possibly amplified and sent back into the reverberation chamber 110 via the Tx antenna 184 of the delay circuit. When fed back into the reverberation chamber 110, a part of the signal will be received again by the Rx antenna 183 of the delay circuit and delayed further. This will continue until the loop back power is too small to detect. Significant for this solution is that the power difference between delay taps will be the same, the delay between delay taps will be the same, and the looped signal will be faded once more for each turn through the delay circuit and will thus fade quicker for each loop. FIG. 7b shows the delay profile for a reverberation chamber with and without a delay circuit.

Figure 8:
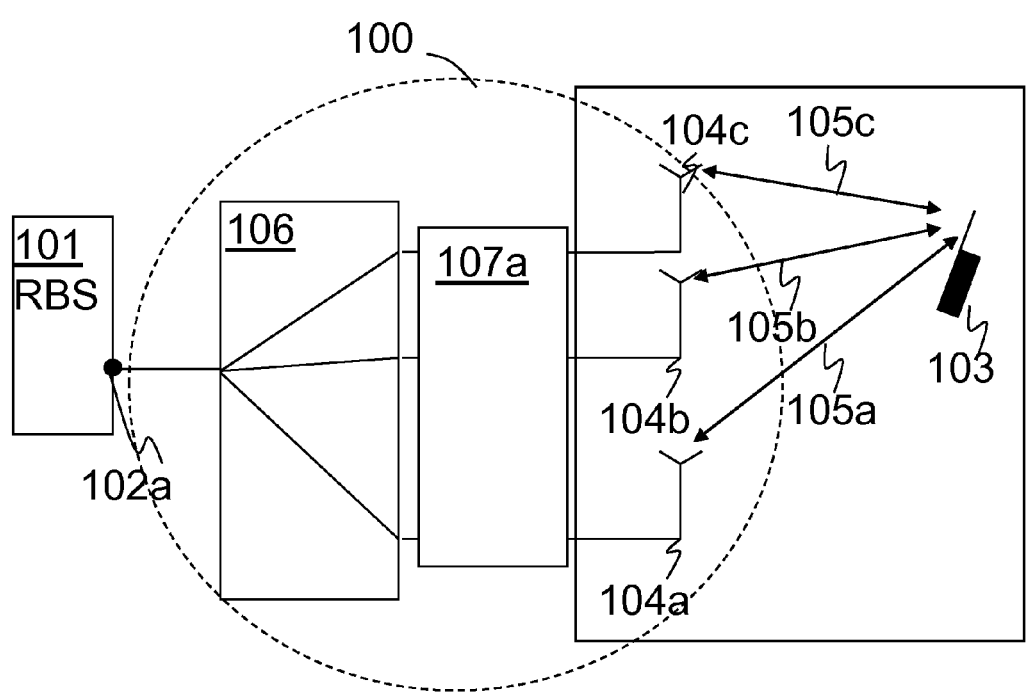
FIGS. 8, 9 and 10a illustrate schematically the device in a test environment comprising a test chamber according to some embodiments of the present invention.

In one embodiment of the present invention, schematically illustrated in FIG. 8, the device 100, further comprises at least one additional antenna 104c providing a third radio channel 105c, with a characteristic which may differ from both the first and the second radio channels 105a, 105b characteristics. The multiport circuit 106 connects the three antennas 104a, 104b, 104c with the antenna port 102a of the RBS. It is adapted to split the signal received from the antenna port 102a of the RBS 101, and to forward the split signals to the antennas 104a, 104b, 104c for transmission. The modifying circuit 107a, e.g. implemented as three delay lines and three attenuators, one delay line and one attenuator for each antenna, is adapted to modify the delay and amplitude relation between the split signals before they are transmitted on the antennas 104a, 104b, 104c. If the three antennas 104a, 104b, 104c, provide three radio channels with uncorrelated fading characteristics, the simulated channel model will comprise three delay taps (one for each antenna) which all fade independently from each other. The power and the delay may be varied between the delay taps, by varying the attenuator and delay line settings. By adding still another antenna, another independently fading delay tap will be added to the channel model.

Figure 9:
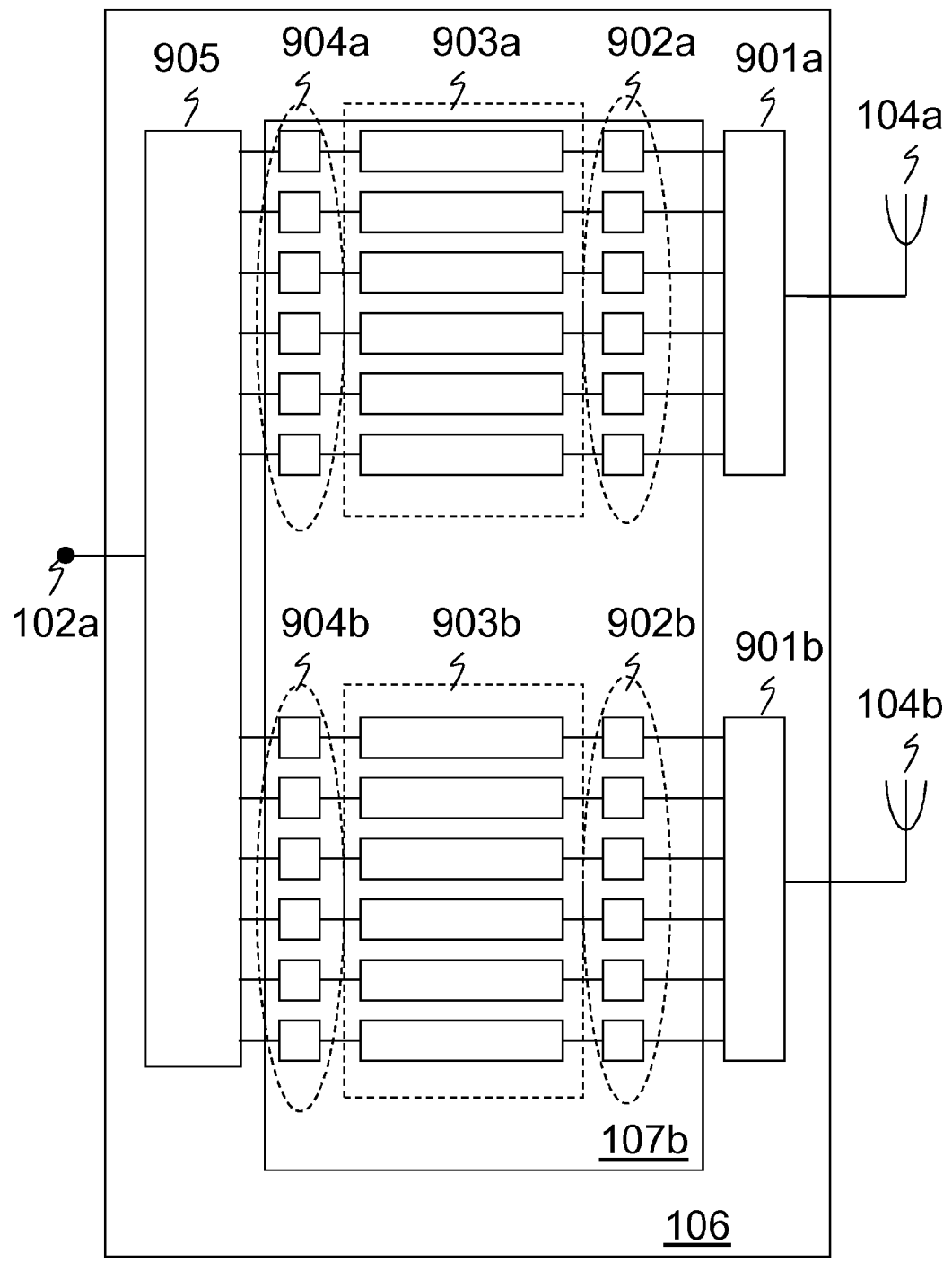

In one further embodiment of the present invention, schematically illustrated in FIG. 9, the device 100 transmits split signals on two antennas 104a, 104b. The multiport circuit 106, is adapted to further split each of the two split signals into several split signals. The modifying circuit 107b will in this case modify the delay relations between the further split signals of the two split signals and also the amplitude relations. Finally, the multiport circuit 106 is also adapted to combine the further split signals of the two split signals into two signals and to transmit them on the two antennas 104a, 104b. In this way, more than two signal paths with different delays are provided between the antenna port 102a and the first and second antenna 104a, 104b respectively, which will thus make it possible to simulate a radio channel with different delay taps. A single RBS antenna is thus replaced by the device 100 of the present invention, comprising two antennas 104a, 104b with uncorrelated fading. The signal received from the antenna port 102a of the RBS is split into a number of split signals in a splitter 905. Half of the split signals are forwarded to the first antenna 104a, and the other half to the second antenna 104b. The split signals forwarded to the first and the second antennas respectively, are modified by a modifying circuit 107a comprising a delay line 903a, 903b, an attenuator 902a, 902b and an amplifier 904a, 904b for each split signal. This will allow for different delay taps for the first antenna, where the delay between taps and the power distribution on the different taps is decided by the delay lines 903a and the attenuators 902a and amplifiers 904a. However, with only one antenna 104a, every delay tap would be faded in exactly the same way. In order to simulate independently faded delay taps, a second antenna 104b is introduced with a delay circuit configured in the same way as for the first antenna 104a, but where the delay lines 903b of the second antenna 104b has an additional phase shift delay each compared to the corresponding delay lines 903a of the first antenna 104a. Such a phase shift delay corresponds to a very short delay in relation to the total delay, and will thus be perceived as a phase shift rather than a delay. The phase shift delay of one split signal should be different from phase shift delays of other split signals, which will result in delay taps that all fade independently when the split signals corresponding to each antenna finally are combined in a combiner 901a, 901b and forwarded to the antennas 104a, 104b for transmission. The implementation of the modifying circuit 107b for this embodiment could be made with surface mounted components on a circuit board.

Figure 10A:
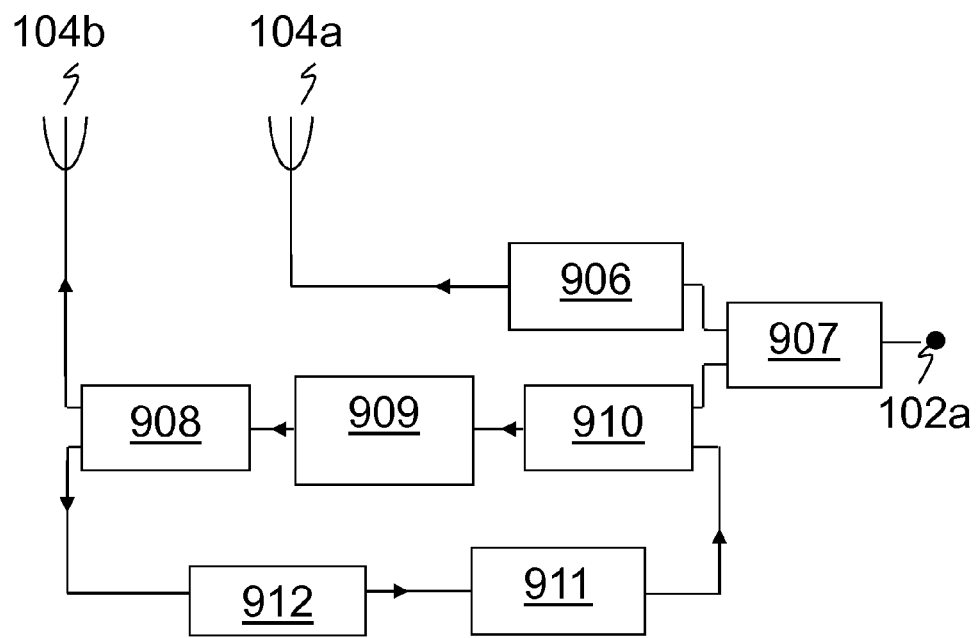
Figure 10B:
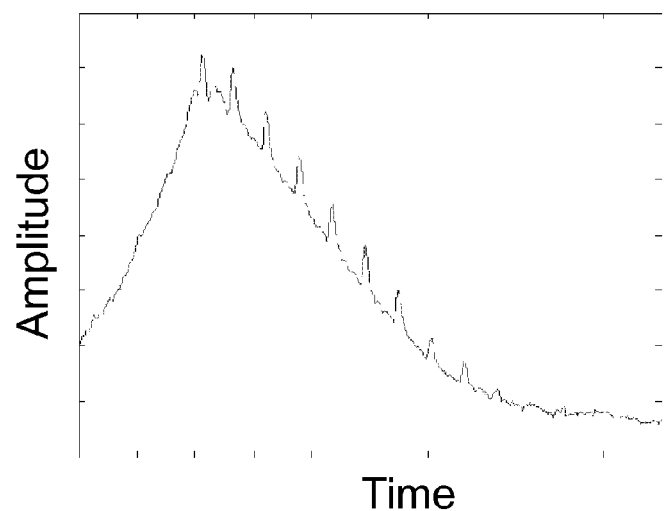
FIG. 10b illustrates the delay profile for a reverberation chamber with the device according to an embodiment of the present invention.

Still another alternative making it possible to provide more than two signal paths with different delays between the antenna port 102a and the first and second antenna 104a, 104b, in order to simulate a radio channel with different delay taps, is illustrated in FIG. 10a. The signal received from the antenna port 102a is split into two in the splitter 907, 25 and a first part of the split signals passes without any additional delay through a variable attenuator 906 to the transmitting antennas 104a, 104b. The second part of the split signal is lead through a combiner 910 via a delay line 909 through a second splitter 908 where another split part of the split signal is fed back through an amplifier 912a and a variable attenuator 911 to the combiner 910. Significant for this solution is that the power difference between the first and the second tap is tunable. The loop back signal is not submitted to any more fading since it is looped back outside the reverberation chamber and the delay between signal taps will be the same. The delay profile of such a solution is shown in FIG. 10b.

The various embodiments described above, e.g. embodiments for simulating fading correlation, fading statistics, delay spread, and polarization characteristics, may all be combined to provide simulation of a radio channel with a combination of different characteristics in one test setup.

Figure 11:
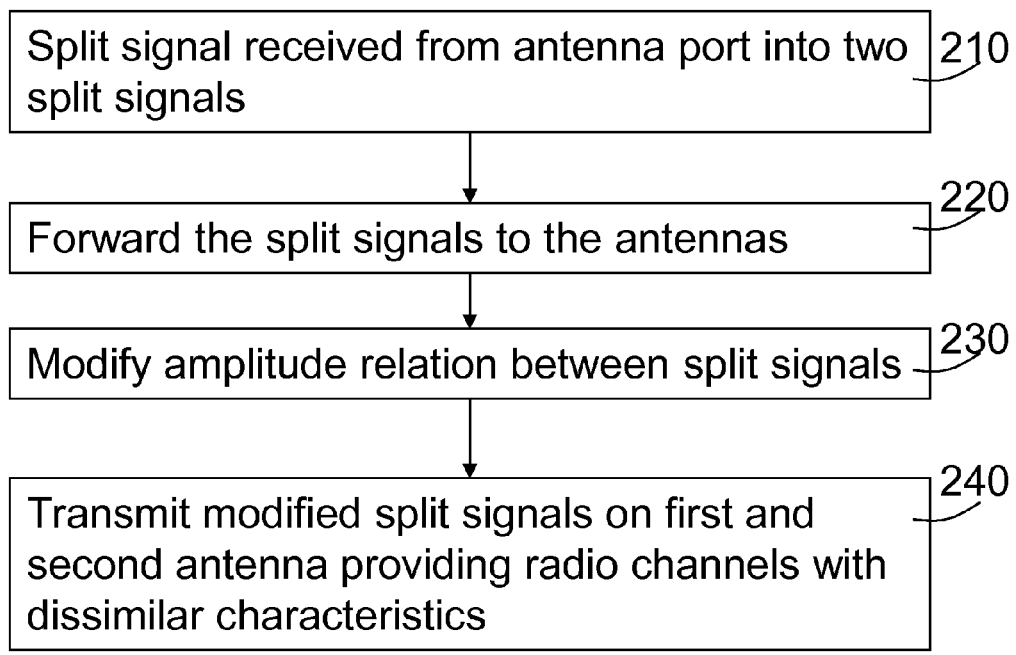
FIGS. 11 and 12 are flowcharts methods according to some embodiments of the present invention.

FIG. 11 is a flowchart of the method according to embodiments of the present invention. It comprises the following steps:

210: Split a signal received from the antenna port(s) of the RBS into one split signal for each transmitting antenna of the device. With one RBS antenna port (single antenna RBS) one signal is received and split in two. With two or more antenna ports (MIMO RBS) two or more signals are received and each one is split in two.

220: Forward a first split signal to the first antenna, and the second split signal to the second antenna.

230: Modify an amplitude relation between the forwarded split signals. This may be done by attenuating or amplifying the split signals. The amplitude relation decides how much of each split signal that will be transmitted in a later step (see step 240 below).

240: Transmit the modified forwarded at least two split signals on the first and second antennas. The signals are transmitted in a reverberation chamber and the transmitted signals are received by the mobile station that may be placed in the reverberation chamber. The first antenna is arranged to provide a first radio channel between this first antenna and the mobile station, and the second antenna is arranged to provide a second radio channel between the second antenna and the mobile station. The two antennas may for example have different antenna characteristics, such as different antenna polarizations, which will in turn provide radio channels with dissimilar polarization characteristics.

In this way a radio channel between each antenna port(s) and the mobile station is simulated, where the simulated radio channel has a characteristic which is a combination of the characteristics of the radio channels between the two antennas and the mobile station, in a relation corresponding to the modified amplitude relation.

In an alternative embodiment of the present invention, the step 240 of transmitting signals on two antennas, may also comprise transmitting signals on at least one additional antenna. If a third antenna is added, the signal received from the antenna port is split into a split signal for each of the three antennas, and each split signal is forwarded to one of the antennas. The amplitude relation between all three split signals is modified before the split signals are transmitted. Another alternative is to add two additional antennas, and to split a signal received from a first antenna port of the RBS in two and to forward these two split signals to a first and second antenna, while a signal received from a second antenna port of the RBS is split into two and forwarded to the third and fourth antenna. This will make it possible to make more complex combinations of radio channel characteristics.

Figure 12:
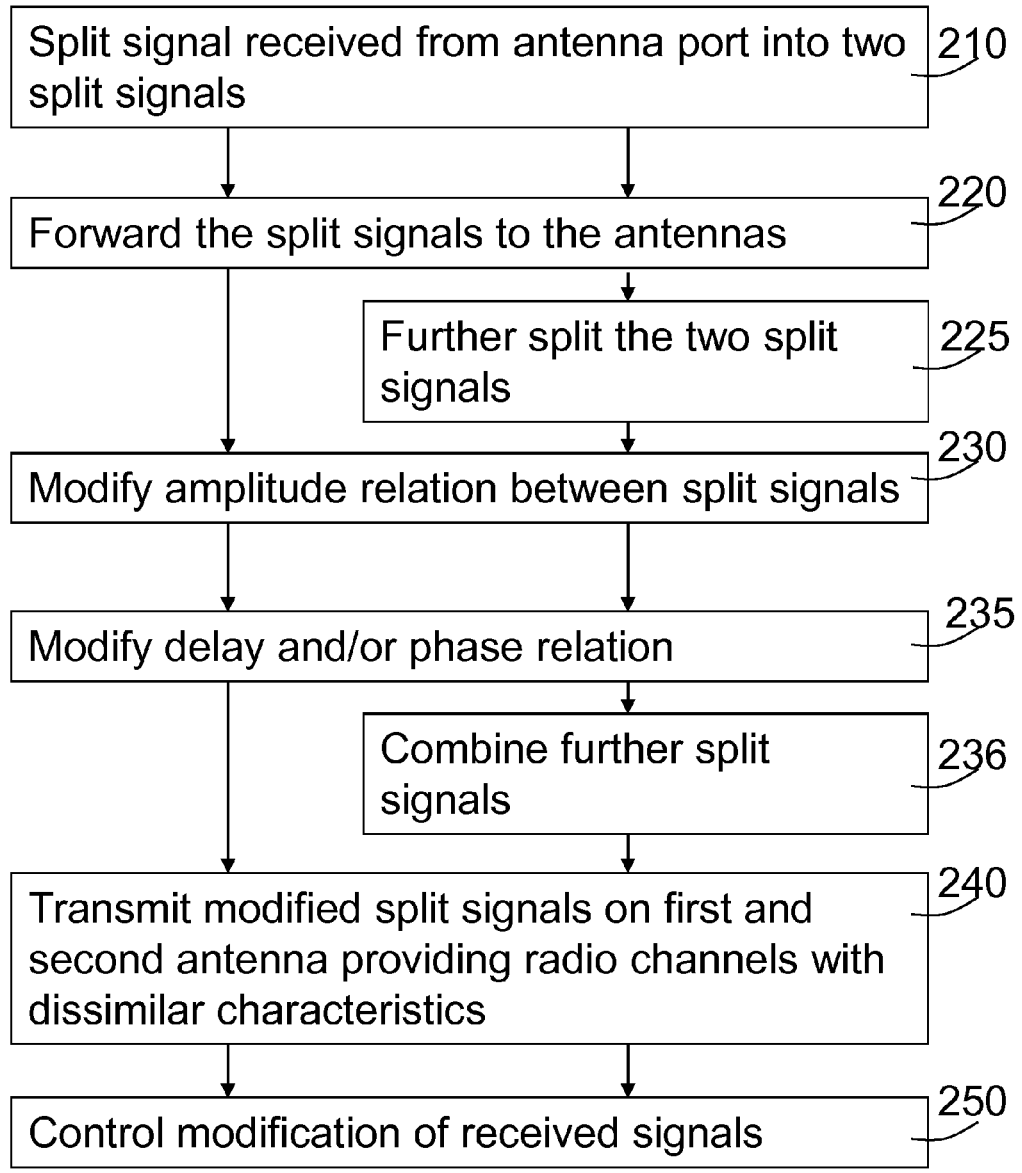

According to a further embodiment, the method comprises the following steps, illustrated in the flowchart of FIG. 12:

210: Split a signal received from the antenna port(s) of the RBS into one split signal for each transmitting antenna of the device.

220: Forward a first split signal to the first antenna, and the second split signal to the second antenna.

230: Modify an amplitude relation between the split signals.

235: Modify also a delay and/or phase relation between the split signals. This makes it possible to do more complex combinations of signals, allowing for a simulation of additional radio channel characteristics, such as delay characteristics, delay spread characteristics, polarization characteristics and fading characteristics, and any combination of these radio channel characteristics in one and same test setup.

240: Transmit the modified at least two split signals on the first and second antennas.

250: Control the modification. This makes it possible to rapidly switch through test conditions with different simulated radio channel characteristics, to facilitate testing. In such an embodiment, performance data feedback from a mobile station or DUT can be used as an input to the control.

According to still another embodiment, the method comprises the following steps, also illustrated in FIGS. 12:

210: Split a signal received from the antenna port(s) of the RBS into one split signal for each transmitting antenna of the device.

220: Forward a first split signal to the first antenna, and the second split signal to the second antenna.

225: Further split each of the two split signals into several split signals.

230+235: Modify an amplitude and delay relation between the further split signals. In this way, more than two signal paths with different delays are provided between the antenna port and the first and second antenna respectively, which will thus make it possible to simulate a radio channel with different delay taps.

236: Combine the further split signals of the two split signals into two signals.

240: Transmit the combined two signals on the first and second antennas.

250: Control the modification.

The above mentioned and described embodiments are only given as examples and should not be limiting to the present invention. Other solutions, uses, objectives, and functions within the scope of the invention as claimed in the accompanying patent claims should be apparent for the person skilled in the art. For example, while the various embodiments have been described with reference to a modifying circuit for modifying an amplitude relation, there exist other possible embodiments where it is not necessary that the modifying circuit modifies the amplitude relation. In fact, in some embodiments, it is sufficient that the circuit achieves or provides a certain amplitude relation. Thus, as used herein, the term modifying does not necessarily mean that the amplitude relation is modified, but instead it would suffice that the amplitude relation is provided. However, in advantageous embodiments such as those described throughout the specification, a modifying circuit is adapted for modifying the amplitude relation.

The invention claimed is:

1. An apparatus for providing a simulated radio channel having a defined characteristic between a first device and a second device in a test environment, wherein the apparatus comprises:

a first antenna configured to transmit signals and to provide a first radio channel between the first antenna and the second device;

a second antenna configured to transmit signals and to provide a second radio channel between the second antenna and the second device, wherein a characteristic of the second radio channel is dissimilar to a characteristic of the first radio channel;

a splitting circuit configured to split a signal received from the first device into at least two split signals, and to forward at least one of the at least two split signals to the first antenna and at least one of the at least two split signals to the second antenna;

a modifying circuit configured to modify a relation between the at least two split signals, thereby providing the simulated radio channel between the first device and the second device, the simulated radio channel having a characteristic that combines, in a relation corresponding to the modified relation, the characteristic of the second radio channel and the characteristic of the first radio channel; and a delay circuit comprising:

an input configured to receive at least part of at least one of the at least two splits signals;

a delay configured to delay the received at least part of the at least one of the at least two split signals to produce a delayed output signal; and output configured to forward the delayed output signal towards the second device, wherein the input is further configured to receive at least part of the forward delayed output signal;

wherein the delay is further configured to delay the received at least part of the forwarded delayed output signal to produce a further delayed output signal; and wherein the output is further configured to forward the further delayed output signal towards the second device.

2. The apparatus according to claim 1, wherein the modifying circuit is configured to modify at least one of a delay relation, an amplitude relation and a phase relation between the at least two split signals.

3. The apparatus according to claim 2, wherein the splitting circuit is configured to further split at least one of the at least two split signals to produce at least two further split signals, wherein the modifying circuit is configured to modify a delay relation between the at least two further split signals to produce at least two further split signals with a modified delay relation therebetween, and wherein the splitting circuit is further configured to comine the at least two further split signals with the modified delay relation therebetween, in order to provide more than two signal paths with different delays between the first device and the first and second antennas.

4. The apparatus according to claim 1, wherein one or more parts of the modifying circuit are variable, and wherein the apparatus further comprises a control circuit configured to control the one or more variable parts of the modifying circuit.

5. The apparatus according to claim 1, wherein the first and second antennas are configured to provide orthogonally polarized radio channels.

6. The apparatus according to claim 1, wherein the first antenna is configured to provide a line-of-sight radio channel and the second antenna is configured to provide a non-line-of-sight radio channel.

7. The apparatus according to claim 1, wherein the first and second antennas are configured to provide radio channels with dissimilar delay characteristics.

8. The apparatus according to claim 1, wherein the first and second antennas are configured to provide radio channels with dissimilar fading characteristics.

9. The apparatus according to claim 1, further comprising at least one additional antenna configured to transmit signals and to provide at least one additional radio channel between the at least one additional antenna and the second device, wherein a characteristic of the at least one additional radio channel is dissimilar to the characteristics of the first and second radio channel; and wherein the splitting circuit is further configured to split the signal received from the first device into at least one additional split signal for the at least one additional antenna, and to forward the at least one additional split signal to the at least one additional antenna.

10. The apparatus according to claim 1, wherein the input of the delay circuit is configured to receive the at least part of the at least one of the at least two split signals prior to the at least one of the at least two split signals being forwarded to at least one of the antennas.

11. The apparatus according to claim 1, wherein the input of the delay circuit is configured to receive the at least part of the at least one of the at least two split signals after transmission of the at least one of the at least two split signals by at least one of the antennas.

12. The apparatus according to claim 1, wherein the delay circuit comprises an amplifier configured to amplify an amplitude of the delayed output signal.

13. The apparatus according to claim 1, wherein the delay circuit comprises an attenuator configured to attenuate an amplitude of the delayed output signal.

14. A test chamber comprising apparatus for providing a simulated radio channel having a defined characteristic between a first device and a second device in a test environment, wherein the apparatus comprises:

a first antenna configured to transmit signals and to provide a first radio channel between the first antenna and the second device;

a second antenna configured to transmit signals and to provide a second radio channel between the second antenna and the second device, wherein a characteristic of the second radio channel is dissimilar to a characteristic of the first radio channel;

a splitting circuit configured to split a signal received from the first device into at least two split signals, and to forward at least one of the at least two split signals to the first antenna and at least one of the at least two split signals to the second antenna a modifying circuit configured to modify a relation between the at least two split signals, thereby providing the simulated radio channel between the first device and the second device, the simulated radio channel having a characteristic that combines, in a relation corresponding to the modified relation, the characteristic of the second radio channel and the characteristic of the first radio channel; and a delay circuit comprising:

an input configured to receive at least part of at least one of the at least two split signals;

a delay configured to delay the received at least part of the at least one of the at least two split signals to produce a delayed output signal; and an output configured to forward the delayed output signal towards the second device, wherein the input is further configured to receive at least part of the forwarded delayed output signal;

wherein the delay is further configured to delay the received at least part of the forwarded delayed output signal to produce a further delayed output signal; and wherein the output is further configured to forward the further delayed output signal towards the second device.

15. A method of providing a simulated radio channel with a defined characteristic between a first device and a second device in a test environment, wherein the method comprises:

splitting a signal received from the first device into at least two split signals;

forwarding at least one of the at least two split signals towards a first antenna and at least one of the at least two split signals towards a second antenna, the first antenna providing a first radio channel between the first antenna and the second device, and the second antenna providing a second radio channel between the second antenna and the second device, wherein a characteristic of the second radio channel is dissimilar to a characteristic of the first radio channel;

modifying a relation between the at least two split signals to produce at least two split signals with a modified relation therebetween;

transmitting at least one of the produced at least two split signals on a first antenna and at least one of the produced at least two split signals on a second antenna, thereby providing the simulated radio channel between the first device and the second device, the simulated radio channel having a characteristic that combines, in a relation corresponding to the modified relation, the characteristic of the second radio channel and the characteristic of the first radio channel;

receiving, at an input of a delay circuit, at least part of the at least one of the at least split signals;

delaying, in a delay of the delay circuit, the at least part of the at least one of the at least two split signals to produce a delayed output signal;

forward the delayed signal to the second device via an output of the delay circuit;

receiving, at the input, at least part of the forwarded delayed signal;

delaying, in the delay, the received at least part of the forwarded delayed signal to produce a further delayed signal; and forwarding the further delayed signal to the second device via the output of the delay circuit.

16. The method according to claim 15, wherein said modifying comprises modifying at least one of a delay relation, an amplitude relation and a phase relation between the at least two split signals.

17. The method according to claim 15, further comprising further splitting at least one of the at least two split signals to produce at least two further split signals, wherein said modifying comprises modifying a delay relation between the at least two further split signals to produce at least two further split signals with a delay relation therebetween, and combining the further split signals with the delay relation therebetween in order to provide more than two signal paths with different delays between the first device and the first and second antennas.

18. The method according to claim 15, further comprising controlling the modification of the relation between the at least two split signals.

19. The method according to claim 15, further comprising providing orthogonally polarized radio channels from the first and second antennas.

20. The method according to claim 15, further comprising providing a line-of sight radio channel from the first antenna, and providing a non-line-of-sight radio channel from the second antenna.

21. The method according to claim 15, further comprising providing radio channels with dissimilar delay characteristics from the first and second antennas.

22. The method according to claim 15, further comprising providing radio channels with dissimilar fading characteristics from the first and second antennas.

23. The method according to claim 15, further comprising:
splitting the signal received from the first device into at least one additional split signal for at least one additional antenna, the at least one additional antenna providing at least one additional radio channel between the at least one additional antenna and the second device, wherein a characteristic of the at least one additional radio channel is dissimilar to the characteristics of the first and second radio channel; and forwarding the at least one additional split signal to the at least one additional antenna.

24. The method according to claim 15, wherein said receiving the at least part of the at least one of the at least two split signals comprises receiving the at least part of the at least one of the at least two split signals prior to the at least one of the at least two split signals being forwarded to at least one of the antennas.

25. The method according to claim 15, wherein said receiving the at least part of the at least one of the at least two split signals comprises receiving the at least part of the at least one of the at least two split signals after transmission of the at least one of the at least two split signals by at least one of the antennas.

26. The method according to claim 15, comprising amplifying an amplitude of the delayed output signal.

27. The method according to claim 15, comprising attenuating an amplitude of the delayed output signal.

* * * * *